(12) United States Patent
Kikinis

(10) Patent No.: US 7,379,986 B2
(45) Date of Patent: *May 27, 2008

(54) SYSTEM, APPARATUS, AND METHOD FOR CONFIGURING A PACKET SWITCHED NETWORK APPLIANCE TO HAVE ACCESS TO A PACKET SWITCHED NETWORK

(75) Inventor: Dan Kikinis, Saratoga, CA (US)

(73) Assignee: IBIZA Liquid Data LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/656,443

(22) Filed: Sep. 5, 2003

(65) Prior Publication Data

US 2004/0049562 A1  Mar. 11, 2004

Related U.S. Application Data (63) Continuation of application No. 09/733,777, filed on Dec. 8, 2000, now Pat. No. 6,622,169, which is a continuation of application No. 09/175,871, filed on Oct. 19, 1998, now Pat. No. 6,161,133.

(51) Int. Cl.
G06F 13/00 (2006.01)

(52) U.S. Cl. ..................................... 709/222

(58) Field of Classification Search ............... 345/733, 345/744, 747; 709/217, 219, 220, 222; 370/386, 429; 379/201.01, 201.02, 201.05
See application file for complete search history.

(56) References Cited

U.S. PATENT DOCUMENTS

| 4,368,963 | A | 1/1983 | Stolov |
| 4,771,425 | A | 9/1988 | Baran et al. |
| 4,779,209 | A | 10/1988 | Stapleford et al. |
| 5,220,611 | A | 6/1993 | Nakamura et al. |
| 5,287,131 | A | 2/1994 | Lee |
| 5,309,546 | A | 5/1994 | Baker et al. |
| 5,359,345 | A | 10/1994 | Hunter |
| 5,398,086 | A | 3/1995 | Nakano et al. |
| 5,444,768 | A | 8/1995 | Lemaire et al. |

(Continued)

OTHER PUBLICATIONS

U.S. Appl. No. 09/733,777, Dan Kikinis.

(Continued)

*Primary Examiner*—Robert B Harrell
(74) *Attorney, Agent, or Firm*—Sterne, Kessler, Goldstein & Fox PLLC (57) ABSTRACT

A network server is adapted to connect on the network with Internet appliances, and to fully configure such appliances over a network connection to access and operate on the Internet. In a preferred embodiment the appliances have first control routines adapted to cooperate with second routines at the server, and also a network address for connection. An initiation signal by a user at a network-connected appliance launches the first routines, causing the appliance to invoke the network address and to establish network communication with the server and to initiate configuration interaction. In some cases special telephone numbers are provided with new appliances, and the dial-up server, through Destination Number Information Service (DNIS) uses the dial-up number in conjunction with a data repository to select appropriate software for interfacing with and configuring a connecting appliance. A full range of services may be provided, including value-added services, such a browsers and browser configuration.

25 Claims, 3 Drawing Sheets

U.S. PATENT DOCUMENTS

| | | |
|---|---|---|
| 5,475,798 A | 12/1995 | Handlos |
| 5,481,320 A | 1/1996 | Konuma et al. |
| 5,491,774 A | 2/1996 | Norris et al. |
| 5,555,035 A | 9/1996 | Mead et al. |
| 5,557,541 A | 9/1996 | Schulhof et al. |
| 5,572,442 A | 11/1996 | Schulhof et al. |
| 5,588,839 A | 12/1996 | Shimoda |
| 5,604,737 A | 2/1997 | Iwami et al. |
| 5,608,786 A | 3/1997 | Gordon |
| 5,640,590 A | 6/1997 | Luther |
| 5,664,228 A | 9/1997 | Mital |
| 5,724,635 A | 3/1998 | Rahman et al. |
| 5,726,984 A | 3/1998 | Kubler et al. |
| 5,727,159 A | 3/1998 | Kikinis |
| 5,732,268 A * | 3/1998 | Bizzarri ................. 713/2 |
| 5,751,706 A | 5/1998 | Land et al. |
| 5,784,555 A * | 7/1998 | Stone ................. 709/220 |
| 5,802,316 A | 9/1998 | Ito et al. |
| 5,848,143 A | 12/1998 | Andrews et al. |
| 5,862,134 A | 1/1999 | Deng |
| 5,883,891 A | 3/1999 | Williams et al. |
| 5,889,774 A | 3/1999 | Mirashrafi et al. |
| 5,926,624 A | 7/1999 | Katz et al. |
| 5,966,440 A | 10/1999 | Hair |
| 6,008,805 A * | 12/1999 | Land et al. ................. 345/744 |
| 6,012,088 A * | 1/2000 | Li et al. ................. 709/219 |
| 6,075,783 A | 6/2000 | Voit |
| 6,128,379 A | 10/2000 | Smyk |
| 6,161,133 A | 12/2000 | Kikinis |
| 6,370,141 B1 * | 4/2002 | Giordano et al. ........... 370/386 |
| 6,603,762 B1 | 8/2003 | Kikinis |

OTHER PUBLICATIONS

WordPerfect 6.1 for Windows for Dummies, IDG Books Worldwide, Inc., pp. 53-54, Jan. 1994.

Farallon, MacRecorder User's Guide, Farallon Computing, Inc., pp. 35-46, Jan. 1990.

Held, Gilbert. Voice Over Data Networks, McGraw-Hill. pp. v-vii and 141-152 (1998).

Boys, Donald R., et al U.S. Appl. No. 09/215,637, filed Dec. 16, 1998, entitled "Apparatus and Methods for Downloading and Playing Audio Files".

* cited by examiner

SYSTEM, APPARATUS, AND METHOD FOR CONFIGURING A PACKET SWITCHED NETWORK APPLIANCE TO HAVE ACCESS TO A PACKET SWITCHED NETWORK

CROSS REFERENCE TO RELATED DOCUMENTS

This application is a continuation of U.S. application Ser. No. 09/733,777, filed Dec. 8, 2000, now U.S. Pat. No. 6,622,169 B2, which is a continuation of U.S. application Ser. No. 09/175,871, filed Oct. 19, 1998, now U.S. Pat. No. 6,161,133, each of which is incorporated herein in its entirety by reference.

FIELD OF THE INVENTION

The present invention is in the field of Internet-capable appliances and pertains more particularly to methods and apparatus for configuring such appliances for Internet access and use by dial-up connection to a configuration server.

BACKGROUND OF THE INVENTION

In recent years the information and data network known commonly as the Internet, together with advances in computer hardware and software, has led to a new multi-media telephone system known in the art by several names. In this relatively new systemology, telephone calls are simulated by multi-media computer equipment, and data, such as audio and or video data, is transmitted over data networks as data packets. In this application the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony (DNT). The conventional system is familiar to nearly all, and is the system most people have installed in their homes, through which they typically communicate with the outside world. In this system calls are made by dedicated connection, and are switched by dedicated connections.

The computer-simulated, or DNT systems, are familiar to those who use and understand computer systems. Perhaps the best example of DNT is telephone service provided over the Internet, which will be referred to herein as Internet Protocol Network Telephony (IPNT), by far the most extensive, but still a subset of DNT. DNT is a term used to describe basically any type of packet switched network whether public or private. Examples of DNT networks include the public Internet, Intranets, private company owned wide area networks (WANs), and so on. These DNT networks may operate using several differing or combined protocol, but generally are supportive of DNT.

Both systems use signals transmitted over network links. In fact, connection to data networks for DNT such as IPNT is typically accomplished over local telephone lines, used to reach such as an Internet Service Provider (ISP). The definitive difference is that COST telephony may be considered to be connection-oriented as previously described. In the COST system, calls are placed and connected by a specific dedicated path, and the connection path is maintained over the time of the call. Bandwidth is thus assured. Other calls and data do not share a connected channel path in a COST system. A DNT system, on the other hand, is not connection oriented or dedicated in terms of bandwidth. That is, data, including audio data, is prepared, sent, and received as data packets. The data packets share network links, and may travel by varied and variable paths.

Recent improvements to available technologies associated with the transmission and reception of data packets during real-time DNT communication have enabled companies to successfully add DNT, principally IPNT capabilities, to existing CTI call centers and home-site locations. Such improvements, as described herein and known to the inventor, include methods for guaranteeing available bandwidth or quality of service (QoS) for a transaction, improved mechanisms for organizing, coding, compressing, and carrying data more efficiently using less bandwidth, and methods and apparatus for intelligently replacing lost data via using voice supplementation methods and enhanced buffering capabilities.

One category of relatively new products which may be considered Internet appliances is the category of Internet-capable telephones, also called WEB phones, which operate on the Internet typically without an intervening computer connection. Such telephones have internal computer elements and software or firmware for accessing the Internet and operating on the Internet in DNT communication.

Another category of Internet communication appliances comprises video-phones, wherein a real-time view of the callers is mutually available. These are also Internet appliances. Beyond these communication devices, there are also many other devices (palmtops, laptops, desktop computers, personal organizers, personal digital assistants, and the like, all of which are Internet-capable, and are therefore Internet appliances. Also known to the inventor are appliances, that depart from such an information appliance model, but are devices that can enhance their functionality by being connected.

These Internet appliances are typically used connecting directly by COST phone line to the Internet through an Internet Service Provider (ISP). However, communication centers employing these devices may also be linked to sub-networks, including private networks that are linked to the Internet. In some situations, private individuals maintain such appliances in either stand-alone form or linked to their PCs or other suitable servers, routers etc. Also, other media of linking to the Internet can be found, such as XDSL (X[=any type of] Digital Subscriber Line), power lines, cable modems, wireless networks, satellite networks, laser networks, fiber optic networks etc. Such Internet appliances typically contain at least some elements or aspects of a WEB browser and e-mail clients as well as data communication capability (telephony). Other Internet appliances are designed for recreational use such as WEB TV™. However, due to an Internet connection, IPNT and e-mail capabilities are still possible with the appropriate software.

An issue that remains problematic for users employing such Internet-capable devices (Internet appliances) involves often lengthy and tedious set-up operations that must be performed before first time use and operation of the device. For example, WEB TV™ and AOL™ offer proprietary set-up regimens, but provide access only to high-cost and proprietary networks. Even so, setup can be lengthy requiring passwords, configuration path verification, server identification, and other information. Often, the appropriate protocol specific to a network must be configured for multi-capable devices. In addition, using the proprietary network adds cost to the user. Moreover, a user who moves, or is traveling, may be required to repeat many set-up operations each time he plugs in at a different location in order to verify his account or configure the device at a different origin number.

In addition to multiple steps required to set-up network appliances, software generic to such appliance such as program applications, ISP software, mail box applications, network drivers, etc. must be properly installed and configured for each appliance. A typical user, who may be reasonably computer literate, often experiences much difficulty installing and configuring such software. Sometimes lengthy calls to service centers are required for a user to gain additional instruction not provided with a purchased application. For a user who is not computer-savvy, the task is impossible, and typically must be farmed out to a high-priced consultant.

What is clearly needed is a system including apparatus that allows a one-touch transparent set-up and configuration process that does not require much more than a user ID and account number or credit card number to successfully configure an Internet appliance. Such a service would extend the market for Internet appliances considerably, bringing the advantages of such devices to more people, and the cost could be kept also to a minimum.

SUMMARY OF THE INVENTION

In a preferred embodiment of the present invention a system for configuring Internet appliances, comprising a server having a connection to a network; a data repository accessible by the server, and comprising data related to Internet appliances to be configured; and control routines for configuring Internet appliances via the network connection. Upon receiving a request from an Internet appliance via the network connection the control routines consult the database for correct procedure, and interact with the appliance via the network connection to configure the appliance for Internet access and operation.

In a preferred embodiment the network connection comprises a COST network. Also, in some embodiments dial-up server further comprises an Internet connection, and information from the Internet is used in configuring Internet appliances. In typical embodiments the control routines in the server interact with compatible control routines pre-programmed in the Internet appliance during configuration.

In another aspect of the invention an Internet appliance is provided, comprising a network connection port; and pre-programmed configuration routines, including a network destination address. Upon connection to the network and initiation by the user, the appliance initiates, via the network destination address, a communication with a configuration server connected to the network, and interacts with compatible routines executing on the server to configure the appliance. In this embodiment the network may be a connection-type telephone network and the destination address is a telephone number. Also, the telephone number may be unique to the type of Internet appliance, and may be used by the server to launch appropriate routines to service the particular Internet appliance.

In yet another aspect a method for configuring an Internet appliance, comprising steps of (a) pre-programming the Internet appliance having a network port with first configuration routines adapted to interact with a remote network configuration server having second configuration routines, the first routines including a network destination address; (b) connecting the Internet appliance by the network port to a compatible network; (c) providing an initiation signal at the Internet appliance, the signal causing the appliance to invoke the network destination address and to establish communication and initiate interaction with the configuration server; and (d) configuring the Internet appliance for Internet access by interaction of the first and second configuration routines.

In the method embodiment, in step (a), the network may be a connection-type telephony network and the network destination address is a telephone number. Further, the telephone number may be unique to the type of Internet appliance, and in step (d) the configuration server uses the unique number to launch specific configuration routines adapted for the particular appliance.

The present invention in various embodiments provides for the first time a system whereby Internet appliances may be quickly and easily configured for use without effort or trouble on the part of a user, and by doing so, significantly expands the market and usability of such devices.

DESCRIPTION OF THE PREFERRED EMBODIMENTS

According to a preferred embodiment of the present invention, a service is provided, including innovative apparatus and software, that enables users who have purchased an Internet appliance such as a WEB phone, for example, to obtain third-party assistance in setting-up and configuring the device for successful operation. Such a service is provided to a user through COST telephone access whereby a user dials a provided number to a special dial-up interactive server, and the server configures or setsup the user's device in a fashion largely transparent to the user, and either automatically or semi-automatically. The method and apparatus therefor is detailed in enabling disclosure below. However it should not be construed as a limitation, that the example is specific to a COST network: All equivalent information can be gathered for a DNT-type initial connection, or any other type of system.

Figure 1:
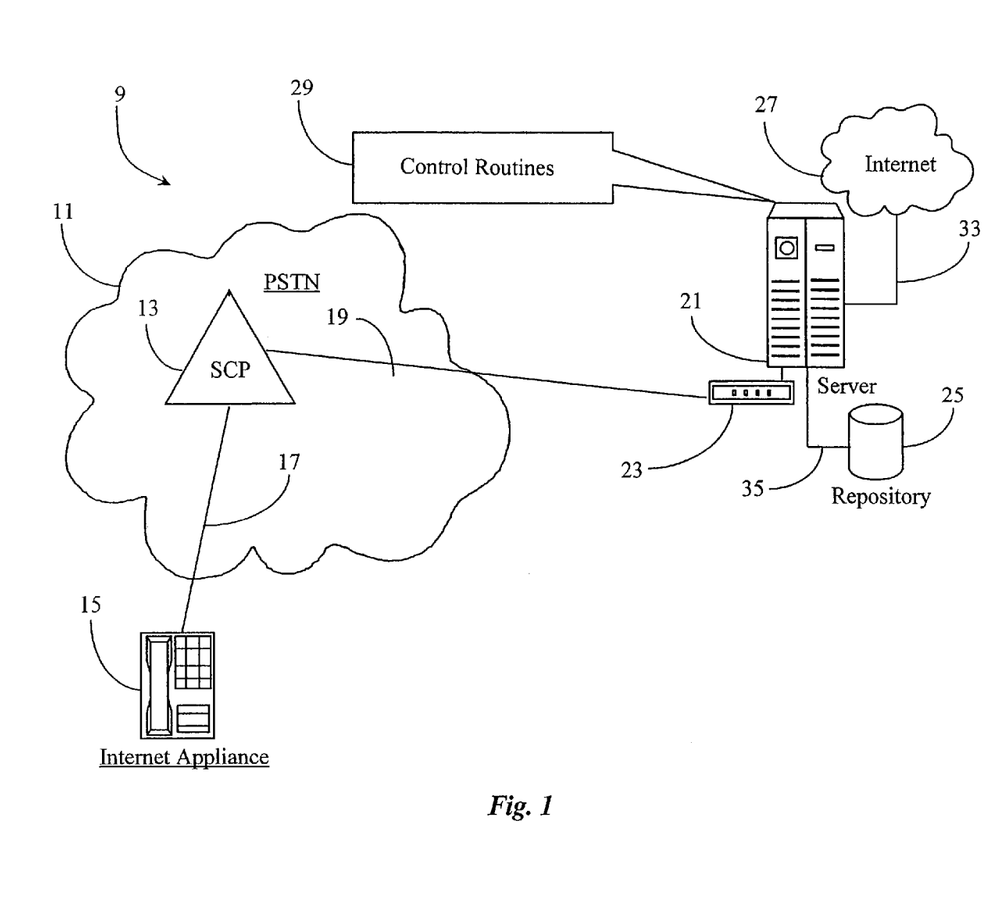
FIG. 1 is a basic overview of system topology according to an embodiment of the present invention.

FIG. 1 is an overview of system topology according to an embodiment of the present invention. A unique service-system 9 is provided as a dial-up technical-service network adapted to setting-up and configuring various Internet appliances purchased by persons, hereinafter generally termed users, from appliance vendors. Such Internet appliances include any device that is used for accessing and operating on the Internet, or other types of switch-packet networks that may stand alone or be linked to the Internet. Examples are WEB phones, WEB TV™s, palmtop computers, Internet capable cell phones, laptop computers, and so on, even including sophisticated desktop and larger computers, or other, non-information appliances such as a refrigerator, air conditioning thermostat, toy, etc., which may be connected to and utilize information from the Internet.

In a preferred embodiment, service system 9 is accessed via a COST telephone connection which is established by way of a service control point (SCP) 13 located in a telephone network such as a publicly-switched telephone-network (PSTN) 11, as illustrated in this example. PSTN 11 may be another type of COST network as is known in the art, or even a private exchange. Other equipment known to be associated with an SCP such as a computer-telephony integration (CTI) processor, an intelligent peripheral, and the like are not illustrated here, but may be assumed to be present.

A user wishing to set-up and configure an Internet appliance 15, in this case a WEB phone for example, may activate a setup procedure in device 15(not shown), which then will dial up server 21 to obtain automatic set-up and configuration for successful operation with the Internet represented in FIG. 1 by element number 27. It should not be assumed that Internet access is provided for the appliance through dial-up server 21, although this may be the case in some more limited embodiments of the invention. Also, in some cases the number provided may actually connect the device to an Internet dial-up point, and connect from there to the set-up server.

Internet 27 may be of the form of another type of data network such as an Intranet, private WAN, and so on. Internet appliance 15 may be any other type of Internet or network appliance. The example of a WEB phone is used here for the purpose of familiarity in providing an example of practicing the invention.

Server 21 and its counterpart set-up procedure in device 15 are at the heart of the present invention, and are provided and adapted to interact with a user's appliance, and in some cases with the user, as previously described (ID, credit etc.). Server 21 may be part of an on-site operation center dedicated to facilitating service-system 9. Dial-up connection to server 21 is provided through a conventional modem bank 23, which is connected to SCP 13 via telephony trunk 19. Modem bank 23 has as many connections (modems) as are required to facilitate many calls from users having different appliances to be configured. Moreover, the system illustrated may be repeated in many different locations and forms to accommodate large numbers of appliances, and so forth.

In a preferred embodiment a 1-800 telephone number (or other no-charge, or in some cases charged numbers) is provided to users who buy a specific participating vendor's Internet appliance or are preprogrammed in the set-up procedure in device 15. The special number can be used to identify, that is, it can be specific to, the vendor and model of the appliance. A user would then plug in his appliance, such as appliance 15, and dial the number. The call arrives at SCP 13 located in PSTN 11 over a telephone line 17 and is immediately transferred via trunk 19 to a modem in modem bank 23 of server 21.

As previously described above, server 21 is uniquely adapted to interacting with callers (users) having Internet appliances that they wish to set-up and configure. To this end, server 21 has software 29 comprising various applications or set-up routines that are created for specific Internet appliances such as appliance 15. Interfacing software (not shown) in server 21 interacts with incoming calls and determines which set-up application 29 to implement based on number recognition via destination number identification service (DNIS) and automatic number identification (ANI). The modem bank and software may be adapted to respond to a large number of telephone numbers cross-referenced with a large variety of appliances. By accessing the DNIS the system knows the number called, and uses this number in a preferred embodiment in conjunction with a data repository 25 to select correct set-up routines (procedures) to properly deal with the specific appliance associated with the call.

In addition to determining a user's needs and location via number recognition as described above, or other equivalent identifiers in different types of networks, the innovative interfacing application is interwoven with set-up applications 29 in a manner so as to facilitate set-up of applications in a manner that adds capability such as the ability to look-up and retrieve data and software. More detail regarding the software of the present invention is provided below.

Server 21 has a data repository 25, as mentioned above, connected by a data link 35. Repository 25 can be of the form of optical storage, hard drive storage, or any other known storage technique known for storing and warehousing data. Repository 25 may be a separate machine as illustrated herein or it may be internal storage to server 21. Data that is stored in repository 25 may comprise data about users, such as addresses, phone numbers, past usage indications, ISPs, and so on. Other data that may be stored in repository 25 includes but is not limited to vendor-supplied data such as purchase information, credit information, lists of software drivers or applications generic to various appliances, Internet directory listings, telephone directory listings, network protocol information and so on. Virtually any required data may be stored in the form of a database in repository 25. Also, such things as the start-up screen (a.k.a. home page) to be installed in the appliance and other Internet related services and functions may be stored and set up.

Server 21 has an optional capability of accessing the Internet (27) as illustrated via data link 33. In a preferred embodiment, server 21 maintains a constant Internet connection adapted to allow server 21 to navigate to and communicate with other known servers, such as vendor servers, from where additional software and data may be acquired as needed that may not be immediately on-hand. However, this is not required to practice the present invention, but rather a convenience. Having Internet connection also allows participating vendors to up-load updated routines and possibly exchange information about users. It also allows the offering of new software to existing, already set up users, by letting their appliances receive such indication, or in case of non-info appliances, letting the user know by other means, such as e-mail, fax, mail etc., or by having the appliance look up and possibly connect to the server in certain, periodic, pre-programmed or flexible intervals. Also, some reporting of users activities may happen then, in order to offer better, more suitable services and functions.

According to a preferred embodiment, server 21 uses DNIS and ANI, which are services provided by most COST networks, to draw product identification associations to, and locate particular users. For example, vendors may supply or program into device 15 a separate dial-up number for each model of Internet appliance offered for sale to the public. Therefore, a user purchasing a particular appliance will have a number specific to that appliance. If an Internet appliance such as appliance 15 has more than one version, then different numbers are given for each version and so on. Once server 21 recognizes the number called (DNIS), an appropriate set-up application such as one of applications 29 is accessed and executed. Alternatively, the appliances could call all the same number, and identify themselves to server 21 when connected.

ANI is used in some embodiments by the dial-up server to identify a user, locate the user, and so on, which information may be useful in setup for determining such as a closest ISP access number for an appliance, and so on.

In set up of appliances, in many cases the user of the device will need an ISP. By using ANI, server 21 may locate several ISPs local to the user and make a suggestion to the user based in part on the ISP's contribution to service 9. Server 21 may then launch an appropriate ISP set-up application, and may also download and configure applications to the user's appliance such as e-mail programs, browser applications, and so on. Interactive voice response (IVR) techniques (not shown) may also be used to interact with users during set-up procedures wherein credit card numbers or user-created passwords or profile names are required. Set-up information including software and protocol drivers are delivered to a user via the dial-up connection (19, 17). In some cases, server 21 may talk directly to a counterpart at the ISP and open the account for the user's appliance 15.

ISPs, vendors, and network providers may contribute revenue to a provider of service system 9 for various reasons as may pertain to their business motivation. For example, an ISP may contribute in exchange for referrals to their service. A vendor may be motivated by a desire to lighten their service department load and perhaps to sell additional software, or pay provider of service 9 to distribute free upgrades, in order to avoid litigation. A network provider may be motivated by service referrals to their proprietary networks in cases where more than one network is accessible by one appliance. Revenue will also come from end users who are more than happy to pay a small set-up fee in order to avoid all of the hassle associated with traditional set-up and configuration procedures. That may be the case several times over the lifetime of the device, due to area-code changes, moving etc. Such fees may be obtained through the use of pay numbers such as 1-900 numbers, credit cards or the like.

It will be apparent to one with skill in the art that a server and system such as server 21 connected to system 9 may be provided in distributed fashion whereby several individual servers may be connected to a network spanning a large geographical region. Information such as mail server addresses, specific network access protocols, international network protocol rules, and the like may be part of a server's knowledge base and stored in a connected or internal repository such as repository 25.

The capability of service system 9 with respect to setting-up a user's Internet appliance such as appliance 15 is limited only by design. For example, complete configurations of virtually any Internet appliance may be performed largely transparent to the user provided that he or she has the appropriate hardware installed in the appliance and that the appliance is plugged in. In some cases wherein passwords are required or credit card information must be obtained, IVR technology may be used to interact with a user as previously described. IVR prompts may also be used when there is a selection or choice regarding a set-up procedure such as which ISP to use, or which network protocol option to configure to. Also, serving customers worldwide, may require selectively adding or omitting options to meet certain legal or customary requirements in some other countries or areas.

It will be apparent to one with skill in the art that Internet appliances, as categorized in this specification, may vary widely from one another in terms of dedicated purpose. For this reason, set-up applications 29 will also vary widely in terms of definitive process steps, order of process steps, level of IVR interaction required, and so on, in order to configure such appliances. In particular, it should also include such devices as mentioned above, such as bridges, servers and routers (gateway) as may be found in homes etc. That shall cover configuring both the gateway as well as a possible multitude of clients behind it.

Although set-up applications 29 may vary widely from one another due to the varying types of known Internet appliances that may be covered, such differences are confined to the individual set-up applications as previously described. Therefore actual application procedures which are generic to specific appliances are not detailed in this specification. Such set-up applications are written in accordance with product requirements as is known in the art. Interface modules are included in each set-up application 29 invoke interfacing software of the present invention when required. An interaction between an appliance such as appliance 15, and a server such as sever 21, will follow basic steps that will be similar from one interaction to another as executed via interfacing software. Such procedural steps are illustrated in more detail below.

Figure 2:
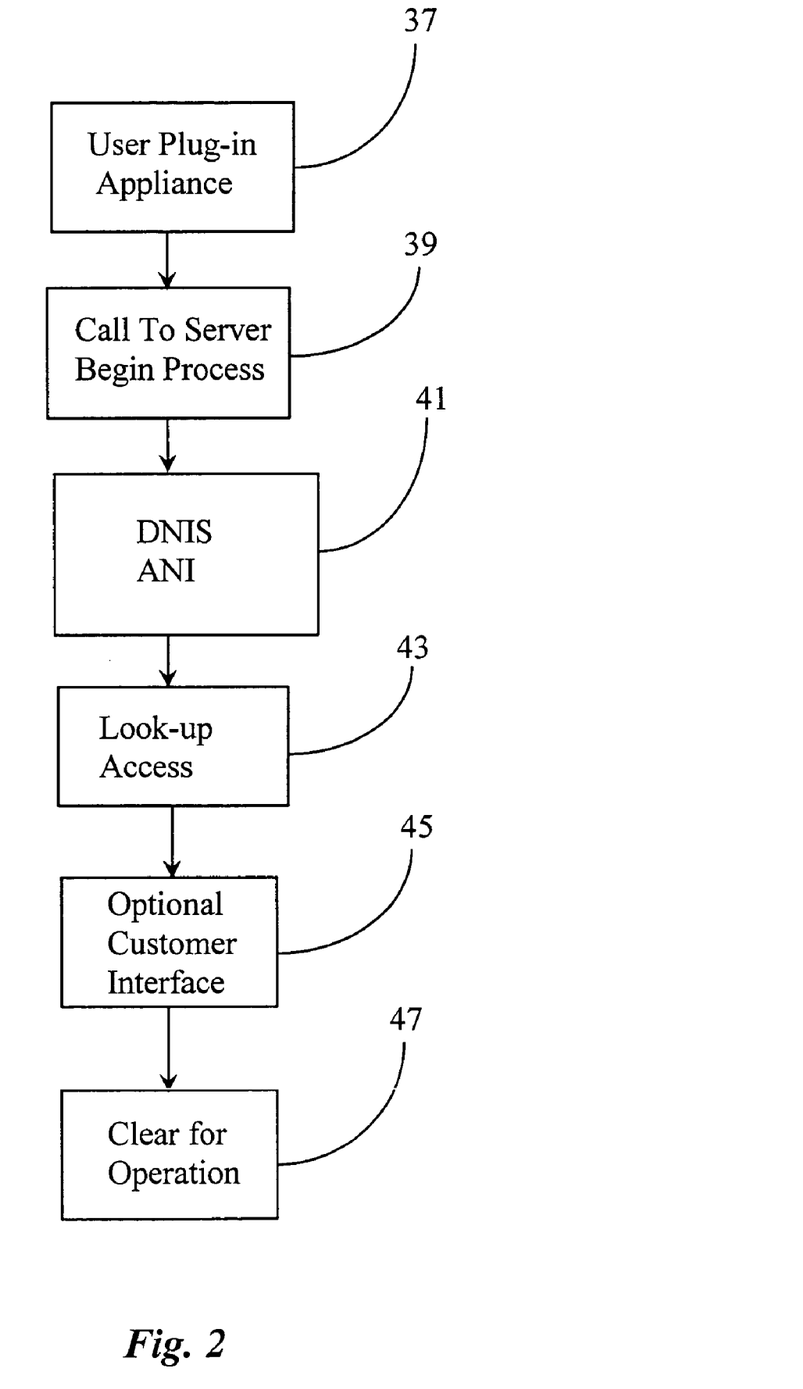
FIG. 2 is a basic workflow diagram illustrating various steps involved in a typical access/configuration procedure as executed via interfacing software according to an embodiment of the present invention.
Figure 3:
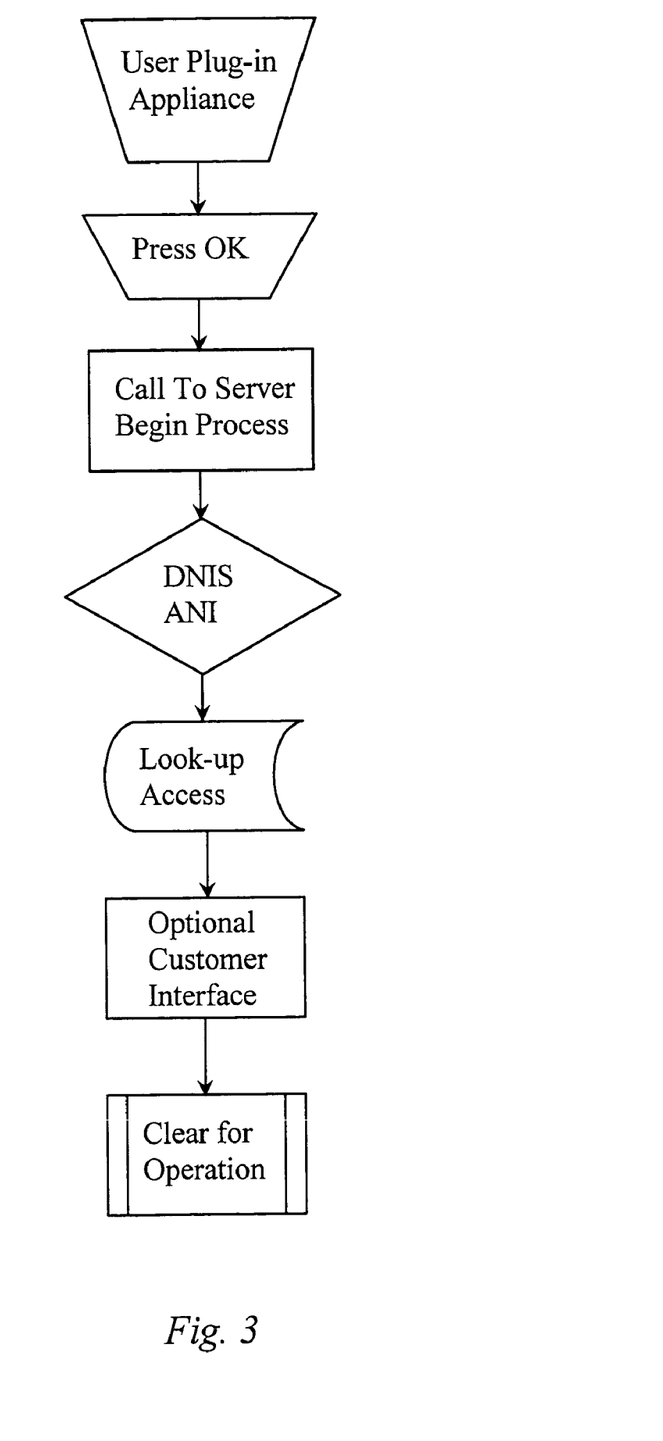

FIG. 2 is a basic workflow diagram illustrating various steps involved in a typical access/configuration procedure as executed via interfacing software according to an embodiment of the present invention. Interfacing software of the present invention is uniquely adapted to determine the needs of a user through DNIS and ANI recognition, or by interaction with the appliance and/or the user. Further capabilities include looking-up and executing a set-up application such as one of applications 29 of FIG. 1, looking-up and retrieving data including software from repository 25 and off-site locations such as other network connected servers, and interceding during set-up operations when required based on user response, or system error.

In step 37, a user plugs in a specific Internet appliance such as appliance 15 of FIG. 1, and insures that all hardware and connections are correct. In step 39, the user calls or the appliance dials after obtaining the user's permission (not shown) a 1-800, a 1-900, or other specific dial-up number provided (typically by appliance vendor) with the appliance purchased. The appliance is then connected to server 21 via normal path such as described with respect to FIG. 1. When server 21 establishes connection, interfacing software recognizes the DNIS number as a number specific to a model of appliance to be configured, and in some cases uses ANI to establish an identity and location of a client in step 41. If by chance a caller is attempting to set-up an Internet appliance at an unregistered number such as a hotel or airport lobby, then IVR technology may be used for the purpose of establishing identity and selecting setup routines. Such variables may be expected considering a wide range of Internet appliances and possible locations for access.

After confirming identity, location of the user, and model number of the appliance, a look-up and access operation is performed wherein an appropriate set-up application is launched, and additional data that may be required such as protocol information, special network drivers, or the like is accessed in step 43.

If it is required that passwords, profile names, credit card numbers or the like be obtained from a user during a set-up application such as application 29, then IVR or other interactive technology may be used to obtain the needed information in step 45, such as IVR style input, on screen questions, voice recognition etc. In certain other situations, it may be that a set-up application cannot be completed because an error is detected with a customer's hardware, such as a missing network card or the like. In this case, interfacing software is called to use IVR technology to inform the user of the problem. When the user fixes the problem, set-up and configuration may resume. Step 45 as an optional step, may be inserted at any required point after user connection in step 39.

After a user's appliance is successfully set-up and configured via a set-up application such as one of applications 29 of FIG. 1, then a clear-for-operation signal may be issued to a user wherein the user may hang-up and begin using his appliance. In some embodiments, a test may be performed, such as transferring the user to a destination on the network the user is configured for. At the destination, the user may be congratulated or welcomed, and perhaps offered a new user instruction or tutorial. Perhaps, a transferred test destination will include additional offers presented by the vendor of the appliance, or the network provider of the network he is operating on.

It will be apparent to one with skill in the art that the process steps described above may vary widely according to desired implementation and rules governing participants such as vendor's, network provider's and the like without departing from the spirit and scope of the present invention. For example, vendors may be required to supply their own software for setting-up and configuring appliances with administrators of service-system 9 adding certain function and interfacing capability via interface software as is described in a preferred embodiment. In another embodiment, the developers of service-system 9 may provide all of the software routines for set-up and configuring appliances as well as interfacing with users, including set-up procedure in device 15.

It will further be apparent to one with skill in the art that a service-system such as system 9 may be adapted to include virtually any network-operated device without departing from the spirit and scope of the present invention. In one embodiment, system 9 may be adapted to configuring an entire communication system wherein multiple units or appliances are connected to a local area network (LAN) and controlled by a central server and private switch. In this case, set-up applications may be adept at configuring the server and network (LAN) for desired protocol as well as making similar configurative changes to the private switch, which may be a telephony switch in a communication center. There are many possibilities both in the corporate sector and within the private sector. The spirit and scope of the present invention is limited only by the claims that follow.

What is claimed is:

1. A system for configuring a packet switched network appliance, comprising:
    a server configured to store first data, to receive second data from the packet switched network appliance via a first network, and to convey third data to the packet switched network appliance via said first network; and
    a control routine configured to execute on said server and to use said first data and said second data to produce said third data, wherein said third data is used to configure the packet switched network appliance to have access to a second network at an access point, wherein said second network is a packet switched network, and wherein a determination of said access point includes a consideration of a distance between the packet switched network appliance and said access point.

2. The system of claim 1, wherein said first network comprises a connection-oriented switched telephony network.

3. The system of claim 1, wherein said server is further configured to receive information from said second network to modify said first data.

4. The system of claim 1, wherein said control routine is further configured to interact with a compatible control routine pre-programmed in the packet switched network appliance.

5. The system of claim 1, wherein said distance between the packet switched network appliance and said access point is a closest distance between the packet switched network appliance and said access point.

6. The system of claim 1, wherein the packet switched network appliance is, prior to receipt of said third data, unconfigured to have access to said second network.

7. A method for configuring a packet switched network appliance, comprising:
    receiving, at a configuration server via a first network, a first data from the packet switched network appliance;
    producing, by the configuration server, a second data using the first data and a third data, wherein the second data is for use in configuring the packet switched network appliance for accessing a second network at an access point, wherein the second network is a packet switched network and a determination of the access point includes a consideration of a distance between the packet switched network appliance and the access point; and
    sending, by the configuration server, the second data to the packet switched network appliance.

8. The method of claim 7, wherein said first network comprises a connection-oriented switched telephony network.

9. The method of claim 7, wherein said configuration server uses at least one of an Automatic Number Identification service and a Destination Number Information Service to select a specific third data for the packet switched network appliance.

10. The method of claim 7, wherein said distance between the packet switched network appliance and said access point is a closest distance between the packet switched network appliance and said access point.

11. The method of claim 7, wherein the packet switched network appliance is, prior to said configuring, unconfigured to have access to said second network.

12. The method of claim 7, further comprising:
    receiving, at said configuration server, information from said second network to modify said third data.

13. A packet switched network appliance, comprising:
    a network connection port; and
    a pre-programmed configuration routine configured to interact, via said network connection port and a first network, with a control routine configured to execute on a server, to convey first data to said control routine, and to receive second data from said control routine, wherein said control routine is configured to use said first data and third data to produce said second data, and said second data is used to configure the packet switched network appliance to have access to a second network at an access point, wherein said second network is a packet switched network, and wherein a determination of said access point includes a consideration of a distance between the packet switched network appliance and said access point.

14. The packet switched network appliance of claim 13, wherein said first network comprises a connection-oriented switched telephony network.

15. The packet switched network appliance of claim 13, wherein said pre-programmed configuration routine is further configured to select said control routine from a set of control routines in said server to interact with said pre-programmed configuration routine to configure the packet switched appliance to have access to said second network.

16. The packet switched network appliance of claim 13, wherein said distance between the packet switched network appliance and said access point is a closest distance between the packet switched network appliance and said access point.

17. The packet switched network appliance of claim 13, wherein the packet switched network appliance is, prior to receipt of said second data, unconfigured to have access to said second network.

18. A system for configuring a packet switched network appliance, comprising:
   a server configured to store first data, to receive second data from the packet switched network appliance, and to convey third data to the packet switched network appliance; and
   a control routine configured to execute on said server and to use said first data and said second data to produce said third data, wherein said control routine is configured to use said third data to configure the packet switched network appliance to have access to a packet switched network at an access point, and wherein a determination of said access point includes a consideration of a distance between the packet switched network appliance and said access point.

19. The system of claim 18, wherein said distance between the packet switched network appliance and said access point is a closest distance between the packet switched network appliance and said access point.

20. The system of claim 18, wherein the packet switched network appliance is, prior to receipt of said third data, unconfigured to have access to said packet switched network.

21. The system of claim 18, wherein said server is further configured to receive information from said second network to modify said first data.

22. A packet switched network appliance, comprising:
   a port; and
   a pre-programmed first routine configured to interact via said port with a second routine configured to execute on a server, to convey first data to said second routine, and to receive second data from said second routine, wherein said second routine is configured to use said first data and third data to produce said second data and said second data is used to configure the packet switched network appliance to have access to a packet switched network at an access point, wherein a determination of said access point includes a consideration of a distance between the packet switched network appliance and said access point.

23. The packet switched network appliance of claim 22, wherein said distance between the packet switched network appliance and said access point is a closest distance between the packet switched network appliance and said access point.

24. The packet switched network appliance of claim 22, wherein the packet switched network appliance is, prior to receipt of said second data, unconfigured to have access to said packet switched network.

25. The packet switched network appliance of claim 22, wherein said pre-programmed first routine is further configured to select said second routine from a set of second routines in said server to interact with said pre-programmed first routine to configure the packet switched appliance to have access to said packet switched network.

* * * * *